United States Patent [19]

Widergren et al.

[11] 4,385,363
[45] May 24, 1983

[54] DISCRETE COSINE TRANSFORMER

[75] Inventors: Robert D. Widergren, Saratoga; Wen-Hsiung Chen, Sunnyvale; Stanley C. Fralick, Saratoga; Andrew G. Tescher, Claremont, all of Calif.

[73] Assignee: Compression Labs, Inc., San Jose, Calif.

[21] Appl. No.: 255,800

[22] Filed: Apr. 20, 1981

Related U.S. Application Data

[62] Division of Ser. No. 969,991, Dec. 15, 1978, Pat. No. 4,302,775.

[51] Int. Cl.³ ............................................. G06F 15/31
[52] U.S. Cl. ................................................. 364/725
[58] Field of Search ............... 364/725, 726, 604, 826, 364/827

[56] References Cited

U.S. PATENT DOCUMENTS

| | | | |
|---|---|---|---|
| 3,920,974 | 11/1975 | Means | 364/725 |
| 4,092,723 | 5/1978 | Picquendar et al. | 364/726 |
| 4,152,772 | 5/1979 | Speiser et al. | 364/725 |
| 4,196,448 | 4/1980 | Whitehouse et al. | 364/725 X |

OTHER PUBLICATIONS

Ahmed et al., "Discrete Cosine Transform", *IEEE Trans. on Computers*, Jan. 1974, pp. 90-93.
Haralick, "A Storage Efficient Way to Implement the Discrete Cosine Transform", *IEEE Trans. on Computers*, Jul. 1976, pp. 764-765.
Chen et al., "A Fast Computational Algorithm for the Discrete Cosine Transform", *IEEE Trans. on Communications*, Sep. 1977, pp. 1004-1009.
Tseng et al., "On Computing the Discrete Cosine Transform", *IEEE Trans. on Computers*, Oct. 1978, pp. 966-968.
Murray, "Microprocessor System for TV Imagery Compression", SPIE vol. 119, *Application of Digital Image Processing*, (IOCC 1977), pp. 121-129.
Whitehouse et al., "A Digital Real Time Intraframe Video Bandwidth Compression System", SPIE vol. 119, *Application of Digital Image Processing*, (IOCC 1977), pp. 64-78.

*Primary Examiner*—David H. Malzahn
*Attorney, Agent, or Firm*—David B. Harrison

[57] ABSTRACT

An improved method and apparatus for calculating discrete cosine transform coefficients from a plurality of digitalized data is disclosed. The pipelined processor utilizes two basic types of circuits arranged in five computational stages. Shuffle and add circuits operate upon prearranged data components at the first, second and fourth stages, while shuffle, add and multiply circuits are used at the third and fifth stages.

4 Claims, 4 Drawing Figures

DISCRETE COSINE TRANSFORMER

BACKGROUND OF THE INVENTION

This is a division of application Ser. No. 969,991, filed Dec. 15, 1978, now U.S. Pat. No. 4,302,775.

The present invention relates to method and apparatus for calculating discrete cosine transform coefficients from a plurality of digitalized data.

Although processors capable of implementing the fast discrete cosine transform are known in general theory to those skilled in the art, such processors were complicated and expensive to implement, particularly at fast rates, such as those associated with digitalized re-current television pictures at NTSC rates.

A need has arisen for a fast discrete cosine transformer capable of operating at broadcast television rates for the purpose of transforming digitalized picture elements into a transform domain for data compression or other image processing. One such application of the transformer of the present invention is found in application Ser. No. 969,991, filed Dec. 15, 1978, now U.S. Pat. No. 4,302,775.

SUMMARY OF THE PRESENT INVENTION

A general object of the present invention is to provide an improved method and apparatus for calculating discrete cosine transform coefficients from a plurality of digitalized data, such as spatial domain television picture elements.

The method comprises five computational levels or stages:

a first stage shuffles, by adding and subtracting prearranged combinations of original data put into the transformer, and provides a first stage data output;

a second stage shuffles the data output of the first stage by further addition and subtraction of prearranged combinations of the first stage data output to yield a second stage data output;

a third stage shuffles by adding, subtacting and multiplying prearranged combinations of the second stage data output to provide a third stage data output;

a fourth stage shuffles by adding and subtacting prearranged combinations of the third stage data output to provide a fourth stage data output; and, a fifth stage shuffles by adding, subtracting and multiplying prearranged, combinations of the fourth stage data output to put out data which has been transformed from the input domain to the transform domain.

The apparatus comprises a pipelined processor system configured of two basic circuit structures, an addition/subtraction circuit, and an addition/subtraction/multiplication circuit so that the first, second and fourth stages include the addition/subtraction circuits while the third and fifth stages include the addition/subtraction/multiplication circuits.

Other objects, advantages and features of the present invention will be apparent to those skilled in the art from consideration of the following detailed description of the preferred embodiment presented with the accompanying drawing.

DETAILED DESCRIPTION OF THE PREFERRED EMBODIMENT

Cosine Processor 60

Figure 1:
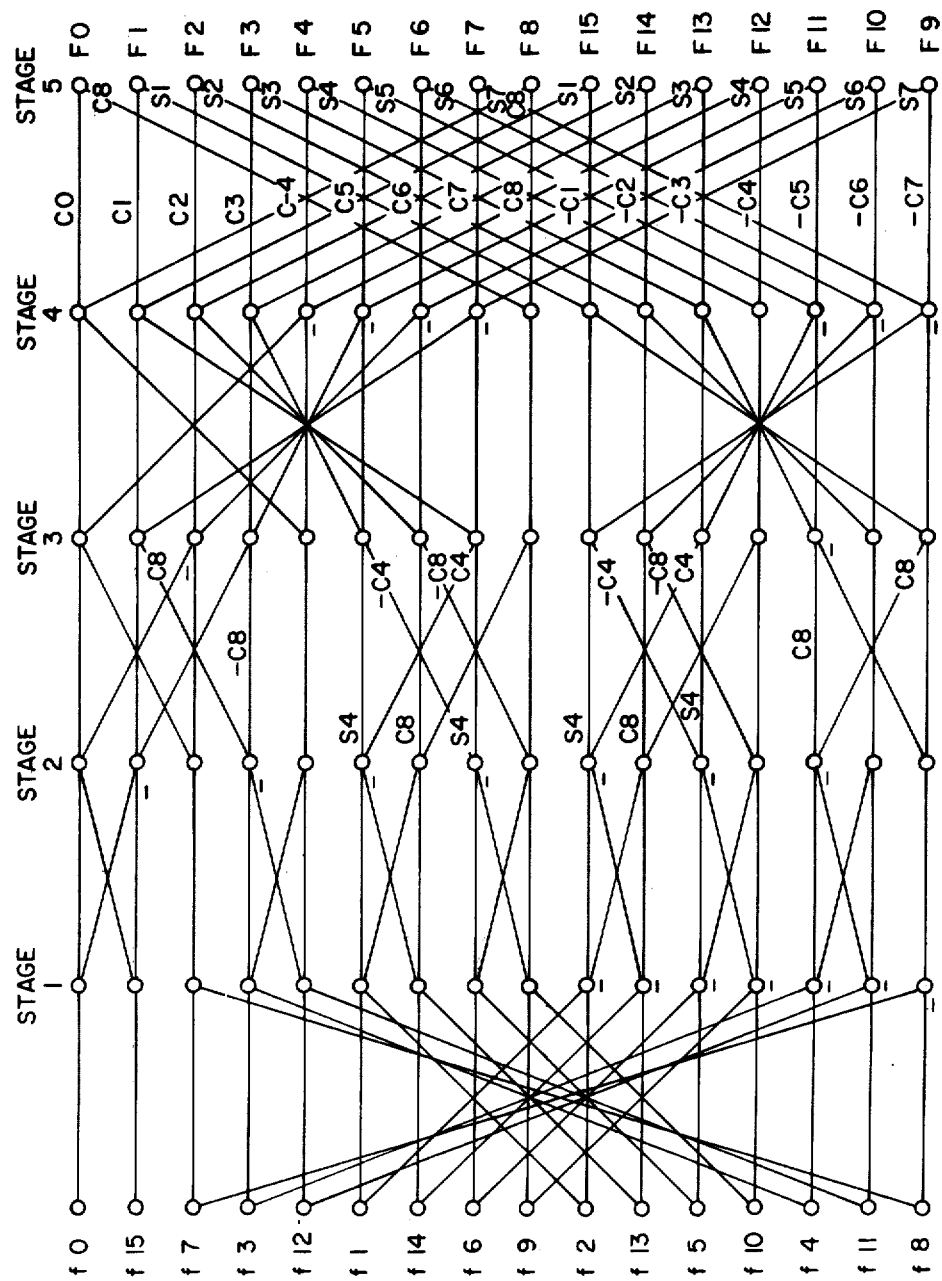
FIG. 1 is a trellis diagram for the discrete cosine transform in one dimension in accordance with the priciples of the present invention.

The cosine transform processor 60 is a modified implementation of a discrete cosine transform algorithm suggested by the coinventors Chen and Fralick and by C. H. Smith in a paper entitled "A Fast Computational Algorithm for the Discrete Cosine Transform," published in *IEEE Transactions on Communication*, September 1977. It is the fastest algorithm known, in the sense that it requires the fewest multiply cycles. Furthermore, it is particularly well-suited to the modular pipelined processor of this invention. A trellis diagram for this algorithm is shown in FIG. 1. Computations are grouped into five sets of 16 operations. These five stages are:

State 1: Sixteen pairs of input data (f 1x) points are added or subtracted to result in sixteen intermediate (f 2x) results. This is called a shuffle and add operation.

Stage 2: This is a second shuffle and add operation with a different shuffling rule operating on (f 2x) to result in (f 3x).

Stage 3: In this stage, the sixteen intermediate results (f 3x) are shuffled, multiplied by constants (in some cases ±1) and, pairwise, added to result in sixteen more intermediate results (f 4x).

Stage 4: This is another shuffle and add operation with a different shuffling rule operating on (f 4x) to result in (f 5x).

Stage 5: This is a second shuffle, multiply and add stage with a new shuffling rule and a new set of multiplier constants. The result is (F 0), the discrete cosine transform of the original data.

Figure 2:
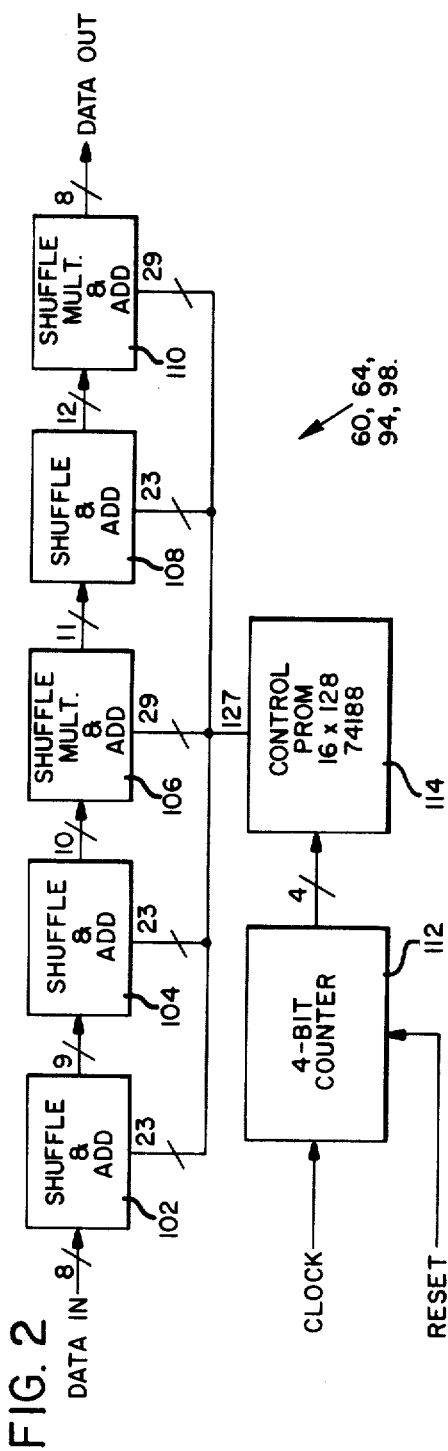
FIG. 2 is a block diagram of the discrete cosine transformer used to implement the trellis diagram set forth in FIG. 1.

Thus, the one-dimensional cosine transform processor 60 may be implemented as a modular pipelined processor from three shuffle and add stages and two shuffle, multiply and add stages. This pipeline concept is shown diagrammatically in FIG. 2. In FIG. 2, data is passed through a first shuffle and add circuit 102, shown diagrammatically in FIG. 3, and configured to perform the arithmetic operations required at stage 1 of the trellis diagram (FIG. 1). A second shuffle and add circuit 104 (FIG. 3) performs the operations required at stage 2 (FIG. 1). A shuffle, multiply and add circuit 106 shown in FIG. 4, performs the operations required at stage 3 (FIG. 1), and a third shuffle and add circuit 108 performs the operations required at state 4 (FIG. 1). A second shuffle, multiply and add circuit 110 performs the calculations required at stage 5 (FIG. 1).

In the implementation shown in FIG. 2, the entire processor 60 is synchronously clocked at the input data rate. During each clock cycle, each stage is provided with a set of control signals which control the stage operation. A four bit counter 112 and control PROM 114 are provided to control each stage.

Figure 3:
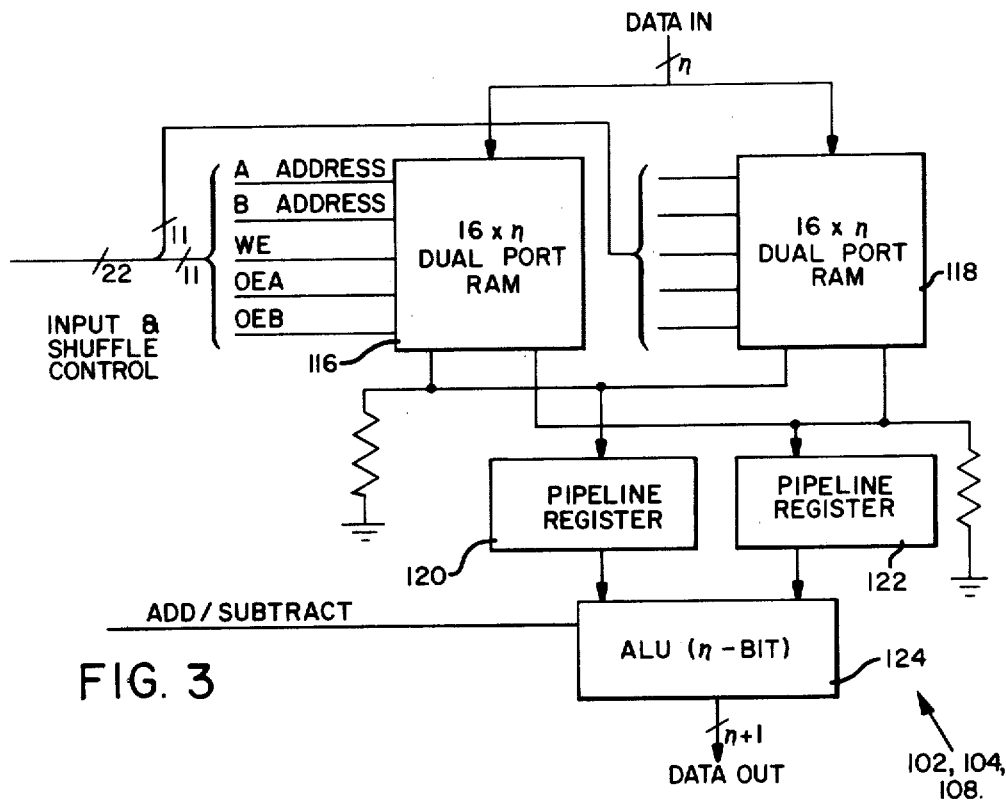
FIG. 3 is a block diagram of a shuffle and add module of the discrete cosine transformer of FIG. 2.

To better understand processor operation, consider FIG. 3 which shows shuffle and add modules 102, 104, 108. Data are loaded into one of the two 16-word dual-port RAM's 116, 118, such as the AMD29705, a 16-word by 4-bit two-port RAM made by Advanced Micro Devices, 901 Thompson Place, Sunnyvale, Calif. 94086. The other RAM is used for the shuffle and add operation. The roles of the RAM's 116 and 118 are interchanged every 16 clock cycles. These RAM's 116, 118 have two output ports, each of which may be independently connected to an addressable memory cell. Thus, to add (f 1i) to (f 1j), port A is addressed with a "j". Within one memory-access time, (f 1i) and (f 1j) will appear on the two output ports. It is necessary to latch the output of each RAM 116, 118 in a corresponding pipeline register 120, 122 at this point in order to achieve a cycle time short enough to handle data at a desired 8 megabit per second data rate. An arithmetic logic unit (ALU) 124 is set to ADD, so that the resultant sum of the ALU 124 will be (f 1i)+(f 1j), although sometimes it is set to SUBTRACT to produce a difference (f 1i)−(f 1j). The next stage must store this resultant, since it will only remain stable until the next clock cycle. 23 lines from the PROM 114 are required to control this stage. Eleven lines go to each RAM 116, 118. These include four "A" port address lines, four "B" port address lines, a write-enable and an output-enable for each port. The twenty-third line determines whether the operation of the ALU 124 is ADD or SUBTRACT. Whenever one of the ports is not enabled its outputs are held low so that a "0" can be added. This allows transfer of data through the ALU 125 with no operation. It is required twice during each stage but the last; e.g. (f 10) and (f 115) are transferred directly to (f 20 and (f 21).

Figure 4:
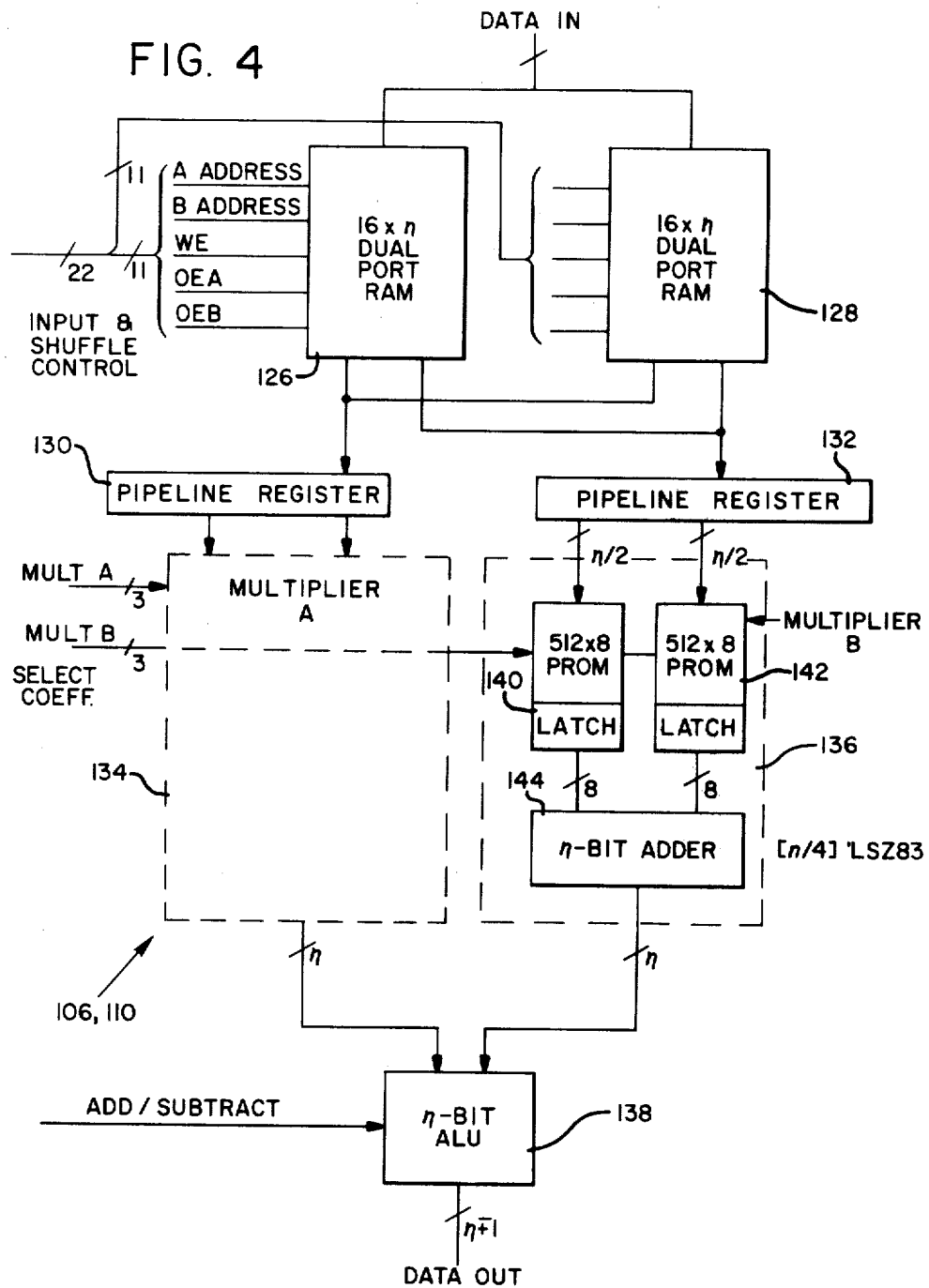
FIG. 4 is a block diagram of a shuffle, multiply and add module of the discrete cosine transformer of FIG. 2.

FIG. 4 shows a shuffle, multiply and add module. It is very similar to the shuffle and add modules 102, 104, 108. The shuffle multiply and add modules 106, 110 include two dual RAM's 126, 128 and pipeline registers 130, 132. A pair of multipliers 134, 136 has been included in series between each register 130, 132 and its input port to an ALU 138. Each multiplier (which must work faster than the maximum operating speed of single chip multipliers such as the AMD 25LS2516 also made by Advanced Micro Devices) includes two output latches PROMS 140, 142 and an n-bit adder 144.

The inclusion of the multipliers 134, 136 enables each data element to be multiplied by a coefficient prior to adding two products. Because of increased time required to accomplish a multiply operation, the PROMs 140, 142 are provided with pipeline registers in the form of the output latched therein.

In order to operate sequentially, the multiply operation must be accomplished once each computational cycle. Since NTSC television signals must be sampled at 8.269 Mbit/sec., each such cycle is 120.9 ns.

This configuration shown in FIG. 4 works because the data to be multiplied are never more than 10 bits wide, and they are always multiplied by a constant which can be selected by 3 bits (i.e., there are never more than 8 distinct constants per stage). The multiplicand is split into the 5 most significant bits and the 5 least significant bits. Each half is used to address a look-up table stored in the PROMS 140, 142. Stored in the look-up table are the partial-products of the 5-bit nibble and every possible coefficient (multiplier). The control PROM 114 generates a 3 bit address corresponding to the coefficient. The partial-products are added in the adder 138. The shuffle, multiply and add modules 106, 110 require 6 more control lines than the shuffle and add modules 102, 104, 108 in order to specify each of the multipliers.

The transform control PROM 114 is shown in FIG. 2. The PROM 114 generates each of the control bits during each cycle and the counter 112 addresses the PROM. The control cycle repeats every 32 clocks, and there are 127 lines to be controlled. Hence, the PROM 114 must be at least 32×128 bits. The speed of the PROM 114 is critical, since it is in series with all pipeline operations. A bipolar PROM with 25 ns access time has been chosen.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A pipeline processing circuit for calculating discrete cosine transform coefficients in real time from a stream of digital source data according to a discrete cosine transform method requiring five computational stages, said circuit comprising:
   first shuffle and add circuit means for adding and subtracting prearranged combinations of source data provided from an input to said first shuffle and add circuit means, to provide first stage data;
   second shuffle and add circuit means connected to said first shuffle and add circuit means for adding and subtracting prearranged combinations of first stage data to provide second stage data;
   first shuffle, multiply and add circuit means connected to said second shuffle and add circuit means for adding, subtracting and multiplying predetermined combinations of second stage data to provide third stage data;
   third shuffle and add circuit means connected to said first shuffle, multiply and add circuit means for adding and subtracting predetermined combinations of third stage data to provide fourth stage data;
   second shuffle, multiply and add circuit means connected to said third shuffle and add circuit means for adding, subtracting and multiplying predetermined combinations of fourth stage data to provide a stream of discrete cosine transformed output coefficients; and
   controller means for controlling said first, second and third shuffle and add circuit means and said first and second shuffle, multiply and add circuit means as pipeline processors to provide said stream of output coefficients at the same rate as said stream of digital source data.

2. The circuit set forth in claim 1 wherein each said shuffle and add circuit means comprises an input data bus and an output data bus, dual storage memory means each connected to said input data bus, dual pipeline register means each connected to a said memory means, and an arithmetic logic unit circuit means connected to said pipeline register means for adding and subtracting said data in accordance with said method and putting resultant data out on said output data bus.

3. The circuit set forth in claim 1 wherein each said shuffle, multiply and add circuit means comprises an input data bus and an output data bus, dual memory means each connected to said input data bus, dual pipeline register means each connected to a said memory means, dual multiplier means each connected to a said pipeline register means to accomplish multiplication of data in said stream, and arithmetic logic unit circuit means connected to the output of said multiplier means for adding and subtracting data in said stream and putting it out on said output data bus.

4. A method for calculating discrete consine transform coefficients in real time from a stream of digital source data according to a discrete cosine transform method requiring five computational stages, said method for calculating comprising the steps of:

adding and subtracting in a first shuffle and add circuit predetermined combinations of data provided from an input to provide first stage data;

adding and subtracting in a second shuffle and add circuit predetermined combinations of first stage data to provide second stage data;

adding, subtracting and multiplying in a first shuffle, add and multiply circuit predetermined combinations of second stage data to provide third stage data;

adding and subtracting in a third shuffle and add circuit predetermined combinations of third stage data to provide fourth stage data;

adding, subtracting and multiplying in a second shuffle, add and multiply circuit prearranged combinations of fourth stage data to provide a stream of discrete cosine transformed output coefficients; and controlling in synchronization said first, second and third shuffle and add circuits and said first and second shuffle, add and multiply circuits to provide a stream of high speed data throughput synchronized to input data stream rate.

* * * * *